United States Patent [19]

Lyon et al.

[11] Patent Number: 5,772,871
[45] Date of Patent: Jun. 30, 1998

[54] COOLANT RECONDITIONING SYSTEM

[75] Inventors: Gregory A. Lyon, Indianapolis; William F. Bettag, Noblesville; Ronald W. Lyon, Carmel, all of Ind.

[73] Assignee: Aircom Manufacturing, Inc., Indianapolis, Ind.

[21] Appl. No.: 728,439

[22] Filed: Oct. 10, 1996

[51] Int. Cl.⁶ ............................................. B01D 17/032
[52] U.S. Cl. .................... 210/168; 210/172; 210/192; 210/195.1; 210/196; 210/202; 210/203; 210/241; 210/242.1; 210/257.1; 210/258; 210/DIG. 5
[58] Field of Search .................. 210/760, 776, 210/167, 168, 172, 192, 195.1, 196, 202, 203, 241, 242.1, 257.1, 258, DIG. 5

[56] References Cited

U.S. PATENT DOCUMENTS

| | | | |
|---|---|---|---|
| 95,924 | 10/1869 | Molinier. | |
| 1,032,458 | 7/1912 | White. | |
| 1,652,036 | 12/1927 | McKesson. | |
| 3,547,553 | 12/1970 | Stanfield | 415/7 |
| 3,556,301 | 1/1971 | Smith | 210/242 |
| 3,612,277 | 10/1971 | VanStavern et al. | 210/179 |
| 3,675,771 | 7/1972 | McKee | 210/242 |
| 3,841,488 | 10/1974 | Yessaian | 210/168 |
| 3,867,288 | 2/1975 | Schaefer | 210/760 |
| 3,897,335 | 7/1975 | Brandt | 210/167 |
| 4,057,498 | 11/1977 | Vidilles | 210/170 |
| 4,361,488 | 11/1982 | White et al. | 210/776 |
| 4,681,680 | 7/1987 | Delons et al. | 210/110 |
| 4,797,205 | 1/1989 | Kitamura | 210/86 |
| 4,865,724 | 9/1989 | Brandt et al. | 210/104 |
| 4,892,666 | 1/1990 | Paulson | 210/776 |
| 5,030,363 | 7/1991 | Pole | 210/776 |
| 5,049,287 | 9/1991 | Pinder, III | 210/776 |
| 5,053,145 | 10/1991 | Ellison | 210/776 |
| 5,158,677 | 10/1992 | Hewitt et al. | 210/776 |
| 5,200,083 | 4/1993 | Kaylor | 210/671 |
| 5,314,618 | 5/1994 | Kaylor et al. | 210/242.3 |
| 5,316,672 | 5/1994 | Wilson et al. | 210/242.3 |
| 5,399,262 | 3/1995 | Hawkins et al. | 210/195.1 |
| 5,417,851 | 5/1995 | Yee | 210/167 |
| 5,451,330 | 9/1995 | Garrett | 210/776 |
| 5,599,457 | 2/1997 | Fanning et al. | 210/776 |

*Primary Examiner*—Peter A. Hruskoci
*Attorney, Agent, or Firm*—Pearne, Gordon, McCoy and Granger LLP

[57] ABSTRACT

A reconditioning system which withdraws coolant from a machine tool sump, filters solids from the coolant, removes tramp oil from the coolant, kills bacteria in the coolant, and returns the reconditioned coolant to the machine tool sump. The reconditioning system includes a separator tank having a coolant inlet, a coolant outlet, and a coalescer pack located between the coolant inlet and the coolant outlet to separate tramp oil from the coolant. An ozone generator is connected to the separator tank for dissolving ozone into the coolant to kill bacteria, yeast and fungus. An in-sump pickup includes a flexible intake hose connected to the separator tank coolant inlet, a suction nozzle having a generally rigid tube attached near an angled or fluted inlet end of the intake hose, and a ring-shaped float encircling the rigid tube. A discharge hose connects the separator tank coolant outlet and the sump. A split diaphragm air pump withdraws coolant from the sump through the intake hose and forces coolant to the sump through the discharge hose. A skimmer assembly removes tramp oil from the surface of the coolant in the separator tank. The skimmer assembly includes a skimmer roll which rotates about a horizontal axis, a storage tank, a reversing electric motor which alternately rotates the skimmer roll in each direction, and a wiper blade which scrapes tramp oil off the peripheral surface of the skimmer roll and directs the tramp oil into the storage tank.

16 Claims, 6 Drawing Sheets

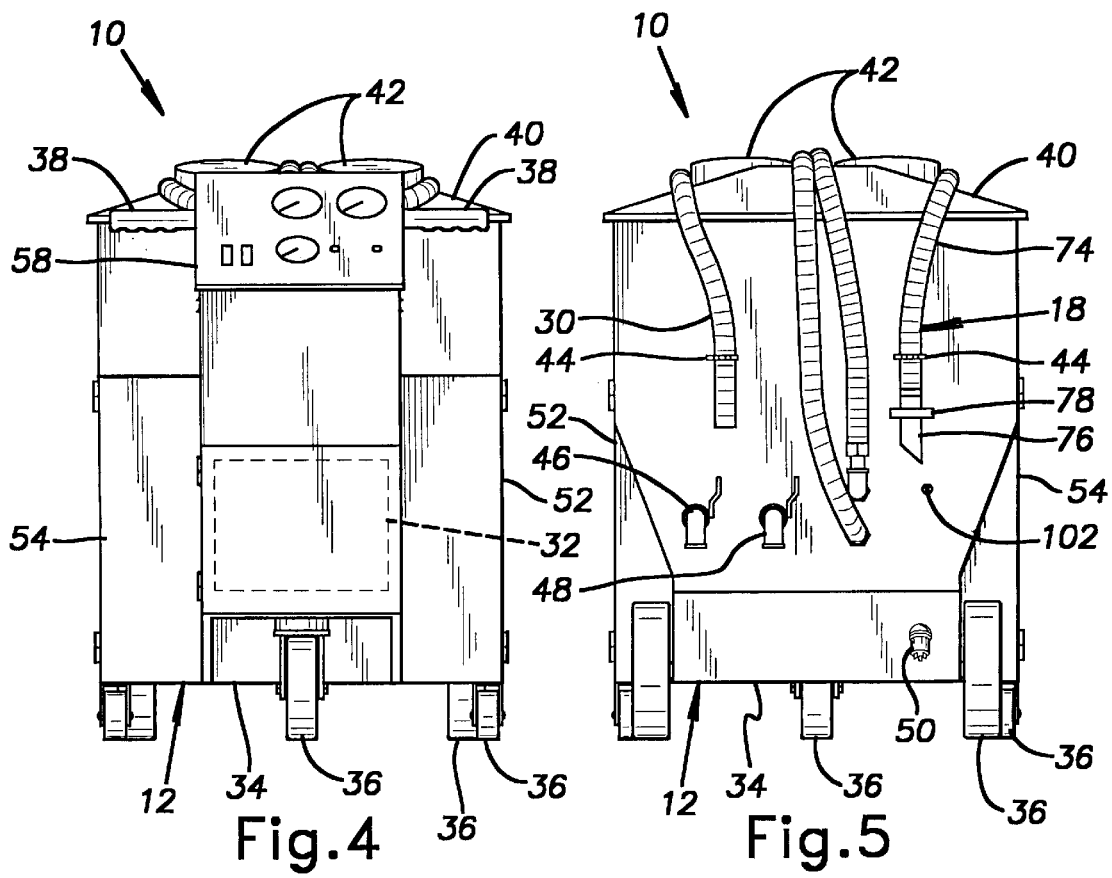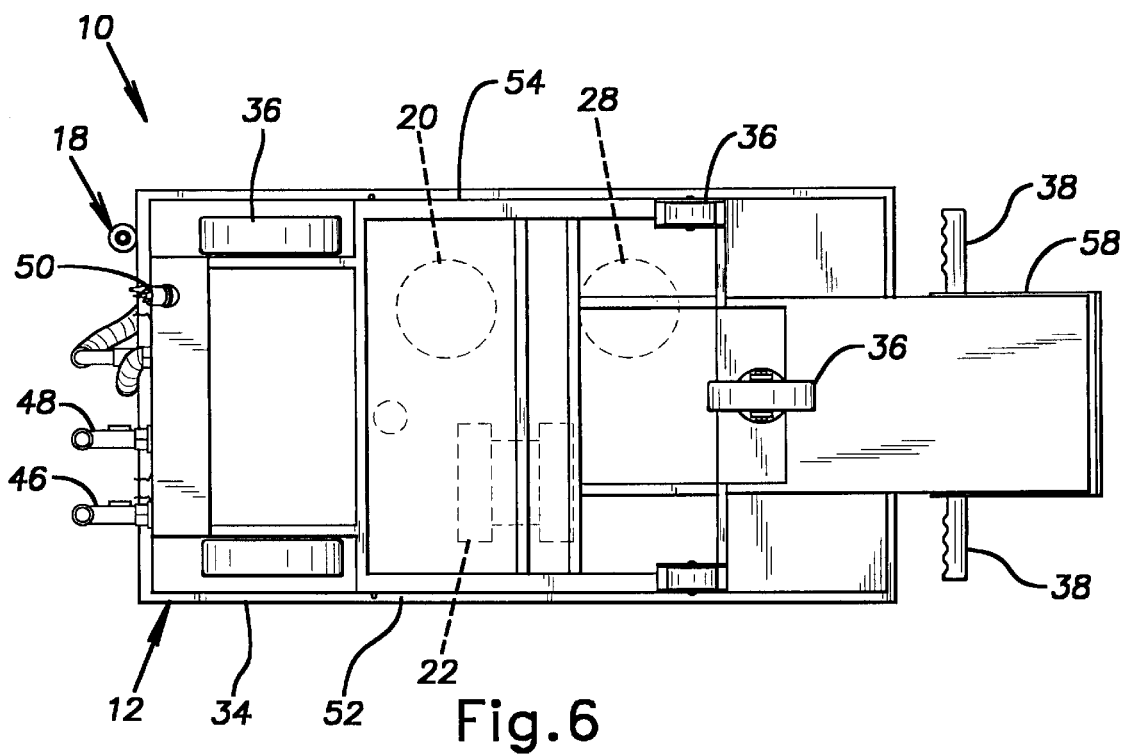

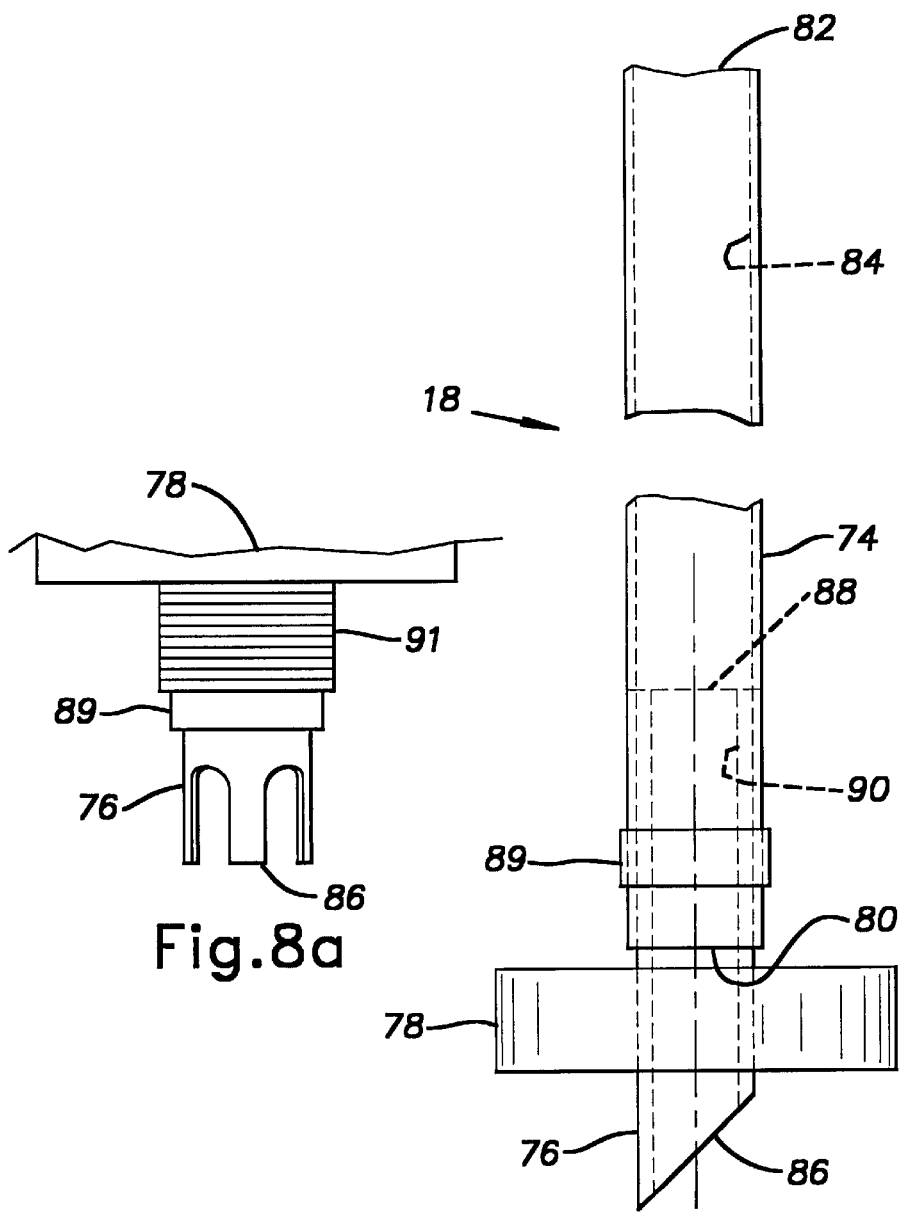
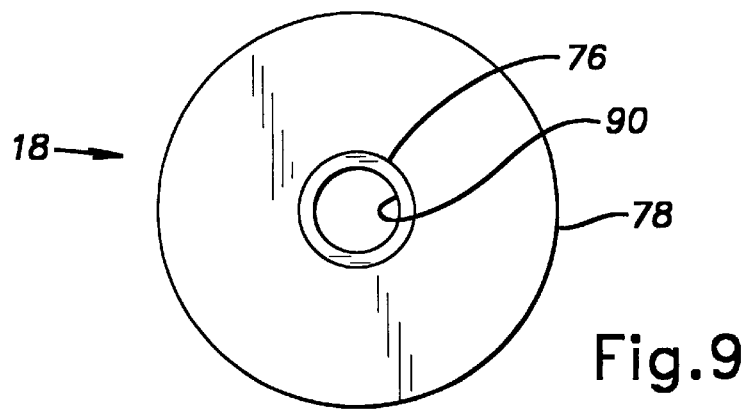

COOLANT RECONDITIONING SYSTEM

BACKGROUND OF THE INVENTION

1. Field of the Invention

The present invention generally relates to reconditioning systems for removing oil from oily liquids and, more specifically, to reconditioning systems for removing tramp oil from coolants used in machining centers.

2. Description of Related Art

Machining centers or machine tools commonly have problems associated with tramp oil, such as mill oil, lubricant, or hydraulic fluid, collecting in coolant. The tramp oil reduces the cutting and cooling qualities of the coolant and is typically discarded after a limited number of hours. However, because the coolant is considered hazardous waste, it is very expensive to handle and discard.

One alternative is to remove the tramp oil from the coolant with an oil skimmer so that the life of the coolant can be extended. However, each of the four types of conventional oil skimmers (disk skimmers, belt skimmers, floating tube or mop-rope type skimmers, and weir skimmers) are inefficient in removing tramp oil from the coolant. The disk skimmers require a relatively calm surface and a constant liquid level. The belt skimmers are typically at least three feet tall and unacceptable for use with conventional machine tools. The floating tube type skimmers work well in large coolant systems, ponds, lakes, rivers or oceans, but there size prohibits use in conventional machine tools. Furthermore, the conventional floating tube skimmers remove far too much coolant along with the tramp oil. The weir skimmers remove as much coolant as tramp oil.

Additionally, the machine tools commonly have problems with bacteria and fungus growing in the coolant. The bacteria causes rancid odors and conditions that can cause operators to develop dermatitis. Typically additives are used to control the bacteria. Conventional additives such as biocides, however, can cause chemical and/or ph changes in the coolant which can degrade the performance of the coolant.

Accordingly, there is a need in the art for a coolant reconditioning system which efficiently removes tramp oil, reduces bacterial growth, causes no ph or chemical change in the coolant, is convenient to use with conventional machine tools, does not harm equipment, is portable, provides consistent coolant quality, and requires little or no consumables.

SUMMARY OF THE INVENTION

The present invention provides a reconditioning system which overcomes at least some of the above-noted problems of the related art. The reconditioning system includes a separator tank adapted for containing oily liquid, an in-sump pickup having an intake hose connected to the separator tank through which flows oily liquid from a sump to the separator tank, and a discharge hose connected to the separator tank through which flows reconditioned liquid from the separator tank to the sump. A pump forces oily liquid from the sump to the separator tank through the intake hose and forces reconditioned liquid from the separator tank to the sump through the discharge hose. A skimmer assembly located in the separator tank removes the oil. The skimmer assembly includes a cylindrically-shaped skimmer roll which is located at the surface of the oily liquid in the separator tank and is rotatable about a substantially horizontal axis, a storage tank, a drive member which alternately rotates the skimmer roll in each direction about the axis, and a wiper blade which bears against the skimmer roll to scrape oil off of the skimmer roll and to direct oil from the skimmer roll into the storage tank.

Preferably, the intake hose is a flexible hose and the in-sump pickup also includes a rigid tube attached to an inlet end of the intake hose and a ring-shaped float encircling the rigid tube. The rigid tube has an angled or fluted inlet end. The float is arranged to provide the buoyancy necessary to float the rigid tube on oily liquid in an oily liquid removing attitude. The in-sump pickup device advantageously works over the side of a machine tool coolant tank or sump to quickly and thoroughly remove oil prior to the remaining liquid in the sump and is relatively inexpensive to produce.

A preferred embodiment of the reconditioning system includes an ozone generator which is connected to the separator tank for dissolving ozone into oily liquid in the separator tank. The ozone, which is sometimes called active oxygen, kills bacteria, yeast and fungus which grows in the sump atmosphere. The ozone generator preferably includes an ultra violet light which creates the ozone.

BRIEF DESCRIPTION OF THE DRAWINGS

These and further features of the present invention will be apparent with reference to the following description and drawings, wherein:

FIG. 4 is a front elevational view of the coolant reconditioning system of FIG. 1;

FIG. 5 is a rear elevational view of the coolant reconditioning system of FIG. 1;

FIG. 6 is a bottom plan view of the coolant reconditioning system of FIG. 1;

FIG. 8 is an enlarged longitudinal view of an in-sump pickup of the coolant reconditioning system of FIG. 1;

FIG. 8a is an enlarged fragmented longitudinal view similar to FIG. 8 of an alternative in-sump pickup;

FIG. 9 is an end view of the in-sump pickup of FIG. 9;

DETAILED DESCRIPTION OF THE PREFERRED EMBODIMENT

Figure 1:
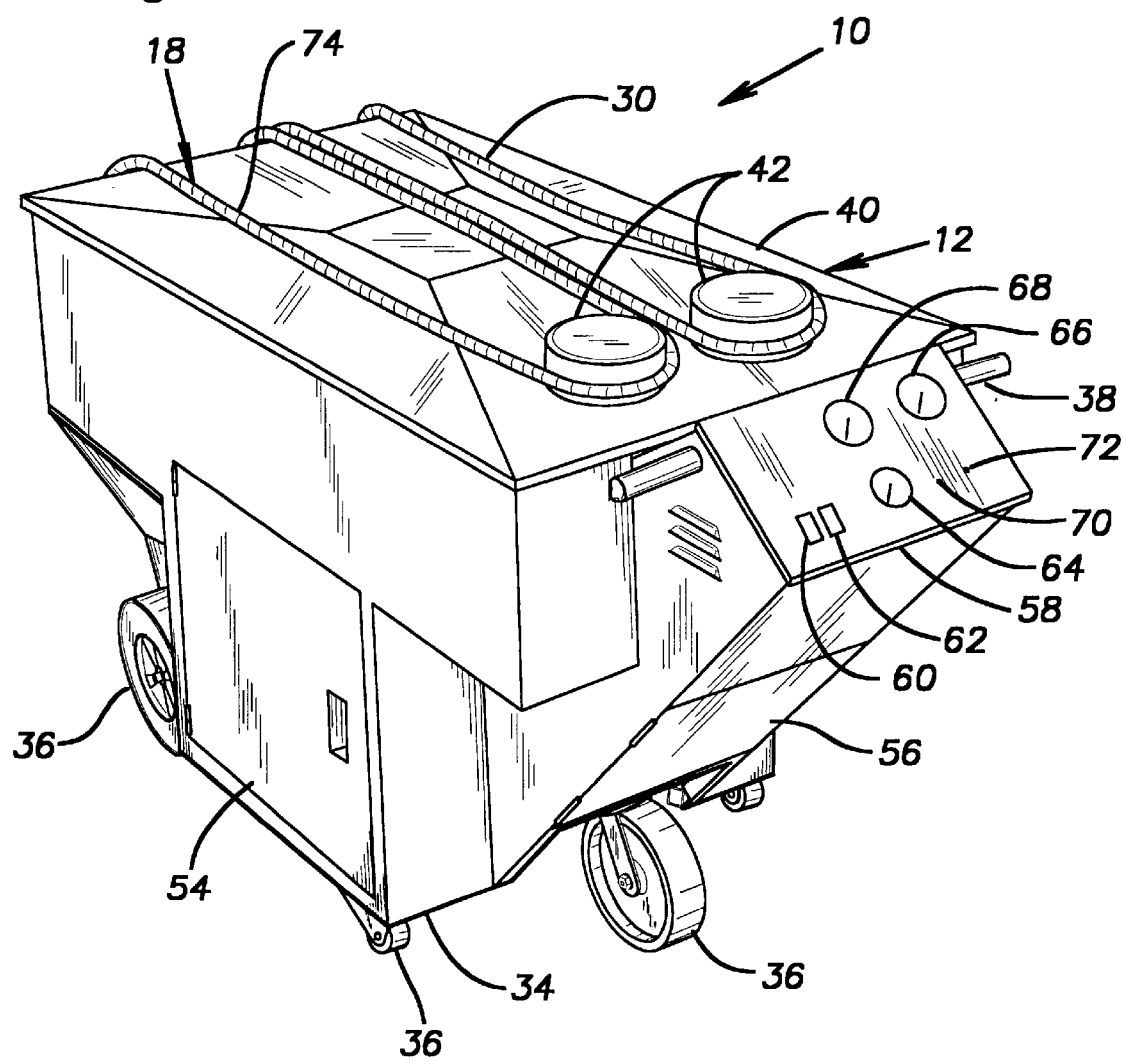
FIG. 1 is a perspective view of a portable coolant reconditioning system embodying the present invention.
Figure 3:
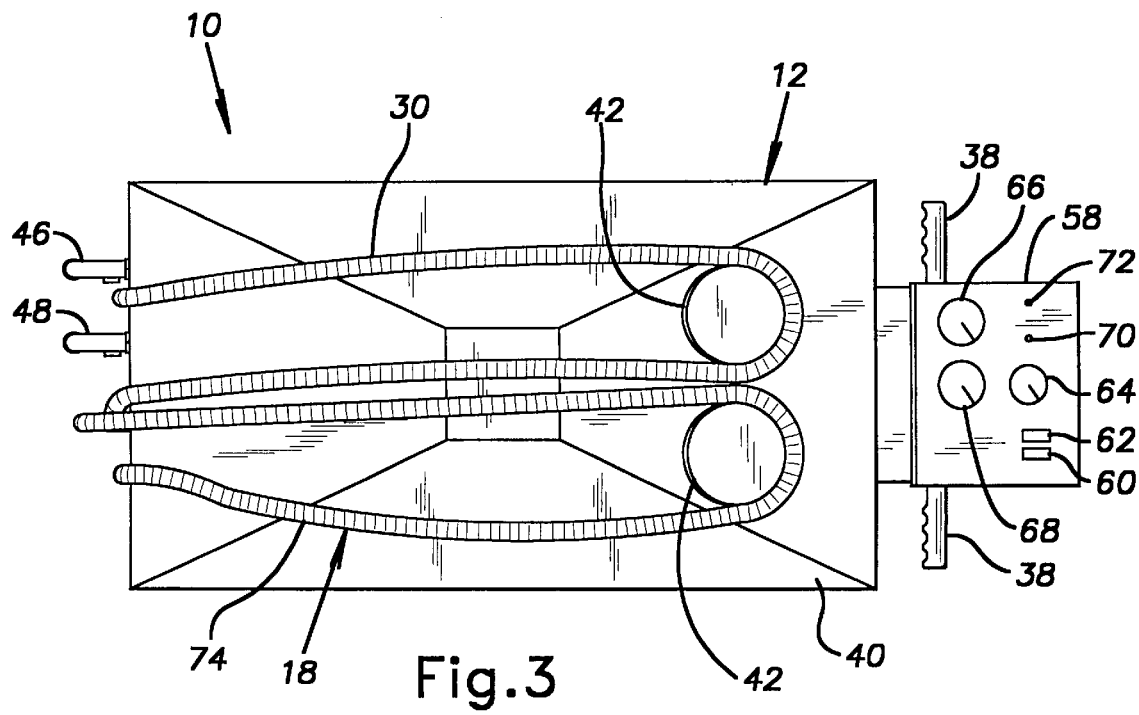
FIG. 3 is a top plan view of the coolant reconditioning system of FIG. 1.
Figure 2:
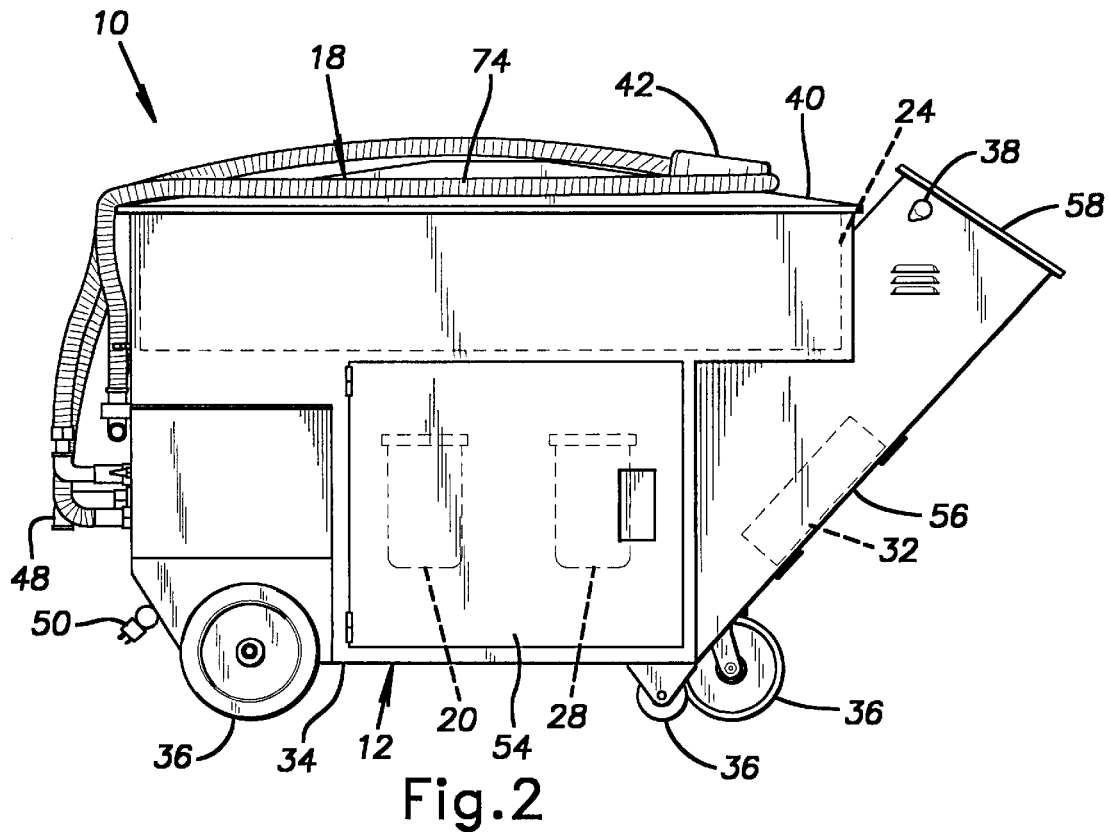
FIG. 2 is a right side elevational view of the coolant reconditioning system of FIG. 1.
Figure 7:
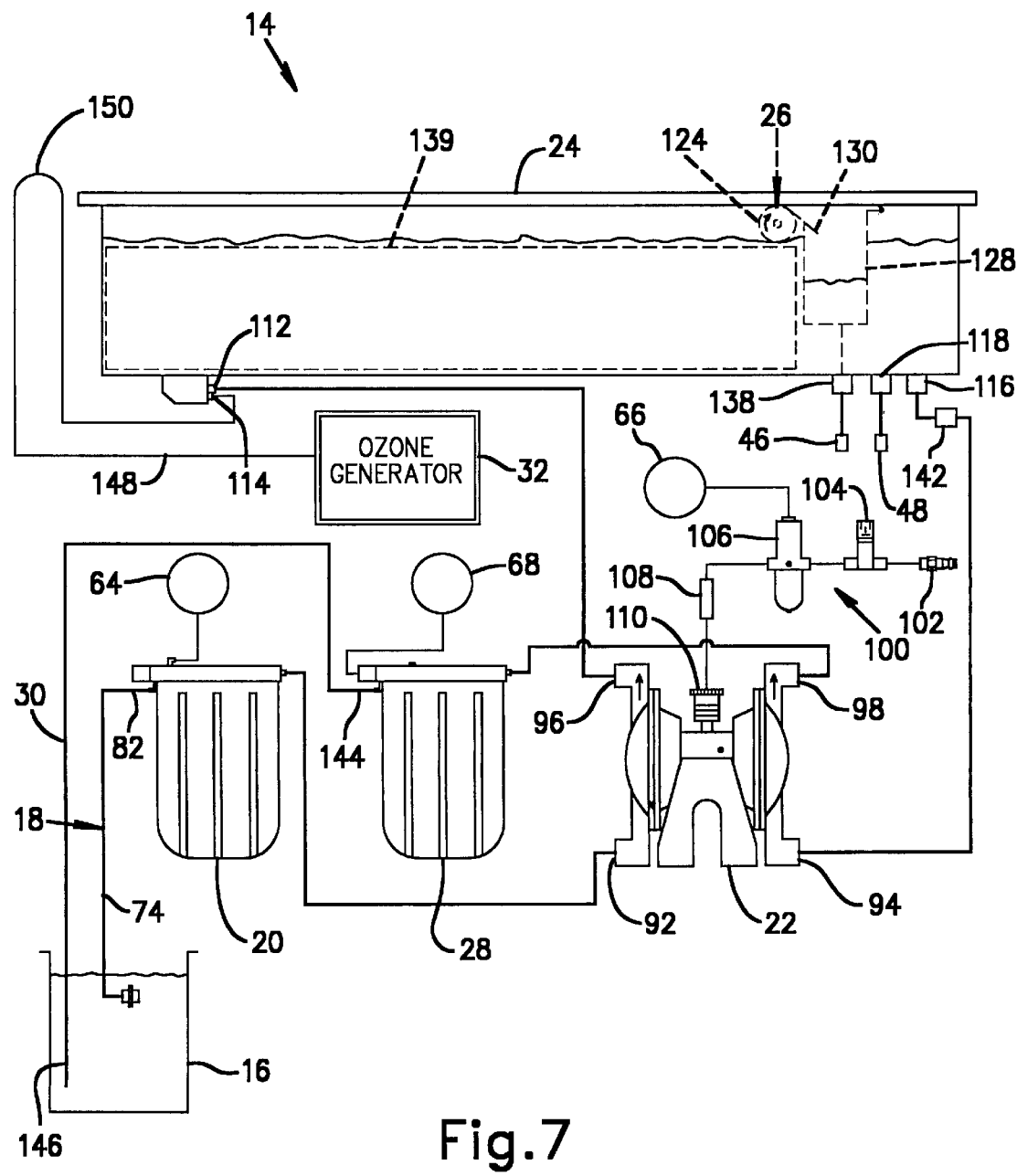
FIG. 7 is schematic diagram of the coolant reconditioning circuit of the coolant reconditioning system of FIG. 1.

FIGS. 1–7 illustrate a portable coolant reconditioning system 10 according the present invention. A cart 12 carries a coolant reconditioning circuit 14 which withdraws coolant from a tank or sump 16 such as, for example a machine tool sump, reconditions the withdrawn coolant, and discharges the reconditioned coolant back into the sump 16. As best shown in FIG. 7, the coolant reconditioning circuit 14 includes an in-sump pickup 18, a initial filter 20, an air pump 22, a separator tank 24, a tramp oil skimmer assembly 26, a final filter 28, a discharge hose 30, and an ozone generator 32. The various components of the reconditioning circuit 14 are connected by tubing formed from a durable material which is flexible and resistant to damage from both oil and ozone such as, for example, reinforced Tygon tubing.

The cart 12 includes an enclosed cabinet 34, a plurality of wheels 36 supporting the cabinet 34, and a pair of handles 38 for maneuvering the cart 12 to a desired location. The separator tank 24 forms the top of the cabinet 34. A cover 40 is provided to prevent extraneous debris from getting into the cart 12 and to dampen noise created within the cart 12. The cover 40 has a pair of upwardly extending hose cylinders 42 located at a forward end of the cover 40. The hose cylinders 42 are sized and located so that the in-sump pickup 18 and the discharge hose 30 can be secured to the cart 12. The in-sump pick up 18 and the discharge hose 30 each extend upwardly along the rear end of the cart 12, forwardly across the top of the cover 40, around the hose cylinders 42, rearwardly across the cover 40, and downwardly along the rear end of the cart 12. The ends of the in-sump pickup 18 and the discharge hose 30 are secured to the rear end of the cart 12 with hose clamps 44. The rear of the cart 12 is also provided with first and second drain valves 46, 48, and a self-retracting power cord 50.

Access to the interior of the cabinet is provided hinged left and right side doors 52, 54 and a hinged front door 56. The initial filter 20 and the final filter 28 are each accessible through the right side door 54. The air motor 22 and its related components are each accessible through the left side door 52. The ozone generator 32 is mounted to the interior side of the front door 56 for complete access.

A control panel 58 is provided at the front of the cart 12. The control panel 58 includes a main power switch 60, a skimmer power switch 62, an initial filter vacuum gauge 64, an air pump pressure gauge 66, and a final filter pressure gauge 68. The control panel 58 also includes first and second indicator lights 70, 72. The first indicator light 70 alerts the user to a problem with the ozone generator 32. The second indicator light 72 indicates an overflow situation in the separator tank 24.

As best shown in FIGS. 8 and 9, the in-sump pickup 18 includes a intake hose 74, a suction nozzle 76, and a collar float 78. The intake hose 74 is a length of relatively flexible hose or tubing having an inlet end 80 and an outlet end 82 and provides an interior passage 84 from the inlet end 80 to the outlet end 82 for transferring coolant from the sump 16 to the initial filter 20 (FIG. 7). The intake hose 74 is preferably formed from a durable material which is flexible and resistant to damage from both oil and ozone such as, for example, reinforced Tygon tubing.

The suction nozzle 76 is a length of relatively rigid pipe or tube which has an inlet end 86, an outlet end 88, and an interior passage 90 therebetween. The inlet end 86 of the suction nozzle 76 forms an acute angle, preferably about 45 degrees, relative to the central axis of the suction nozzle 76. As shown in FIG. 8a, the inlet end 86 of the suction nozzle can alternatively be fluted.

The outlet end 88 of the suction nozzle 76 is attached to the inlet end 80 of the intake hose 74 to provide a connection between the interior passages 90, 84. Preferably, the suction nozzle 76 has an outer diameter sized to fit within the inner diameter of the intake hose 74. A clamp member 89 encircles the exterior surface of the intake hose 74 adjacent the suction nozzle 76 to firmly connect the suction nozzle 76 to the intake hose 74. The suction nozzle 76 is preferably formed from a durable material which is rigid and resistant to damage from both oil and ozone such as, for example, PVC pipe.

The float 78 is generally ring-shaped having an inner diameter sized for receiving the suction nozzle 76 therein with a press-fit to firmly connect the float 78 to the suction nozzle 76. The float 78 is attached to the suction nozzle 76 adjacent the inlet end 86 of the suction nozzle 76. The float 78 is formed from a buoyant foam material such as, for example, SINTRA and adequately sized to suspend the suction nozzle 76 at or near the surface of the fluid within the sump 16 (FIG. 7).

For purposes of adjustment, a plurality of weighted rings 91 are preferably provided on the suction nozzle 76 adjacent and in front of the float 78 as shown in FIG. 8a. A clamp member 89 encircles the exterior surface of the suction nozzle 76 adjacent the weighted rings 91 to hold the weighted rings 91 against the float 78 and on the suction nozzle 76. The weighted rings 91 may be added or removed to the suction nozzle 76 to allow for adjustment of the working depth of the pickup 18 in various fluids.

As best shown in FIG. 7, the outlet end 82 of the intake hose 74 is in fluid communication with the inlet of the initial filter 20. The initial filter 20 has a filter element sized for removing large particles or debris from the coolant. Preferably, the filter element has a size of about 200 microns. The filter element can be either a disposable bag filter or a permanent screen filter. The vacuum gauge 64 is connected to the initial filter 20 for displaying the vacuum at the upstream side of the filter element to indicate to the operator when the filter element should be changed or cleaned.

The air pump 22 is a split diaphragm air pump which pumps two fluid simultaneously. Because the pump 22 both draws the coolant into the separator tank 24 and forces coolant out of the separator tank 24, the level of the coolant within the separator tank remains level. The split diaphragm air pump is also desirable because it gently moves the coolant without emulsifying or homogenizing the oil and coolant.

The air pump 22 has first and second inlets 92, 94 and first and second outlets 96, 98. The first inlet 92 is connected to the outlet of the initial filter 20 and the first outlet 96 is connected to an inlet of the separator tank 24. The air pump 22 is sized to provide a flow rate in the range from about 5 to about 6 gallons per minute. A suitable air pump 22 is available from The ARO Corporation, Bryon, Ohio.

The air pump 22 is controlled by a pneumatic circuit 100 including an inlet plug 102, a solenoid valve 104, an air pressure regulator 106, and a flow control valve 108. The inlet plug 102 is adapted for receiving a standard coupling of an air hose for supplying compressed air or "shop air" to the air pump 22. An outlet of the air plug 102 is connected to an inlet of the solenoid valve 104. The solenoid valve 104 is electrically activated and opens to supply the air pump 22 with compressed air only when the coolant reconditioning system is "powered", that is, electrically supplied with power. An outlet of the solenoid valve 104 is connected to an inlet of the pressure regulator 106. The air pressure regulator 106 is manually adjusted to provide compressed air to the air pump 22 at a desired pressure, typically between about 50 psi and about 80 psi. The pressure gauge 66 is provided to monitor the air pressure supplied by the pressure regulator 106. An outlet of the pressure regulator 106 is connected to an inlet of the pneumatic flow control valve 108. An outlet of the pneumatic flow control valve 108 is connected to an air inlet 110 of the air pump 22.

The separator tank 24 is generally rectangularly-shaped having an open top and is sized to hold a suitable amount of coolant such as, for example about 30 gallons. The separator tank 24 is formed from a suitable material which is resistant to damage from both oil and ozone such as, for example, stainless steel. The separator tank 24 is provided with a coolant inlet 112 and an ozone inlet 114 each located at the bottom of the separator tank 24 and near a rear end of the separator tank 24 and a coolant outlet located at the bottom of the separator tank 24 and near a rear end of the separator tank 24. The separator tank 24 is also provided with a coolant drain 118 located at the bottom of the separator tank 24 and near the forward end of the separator tank 24. The coolant drain 118 is in fluid communication with the second drain valve 48. With this configuration the surface of the coolant remains relatively calm.

Figure 10:
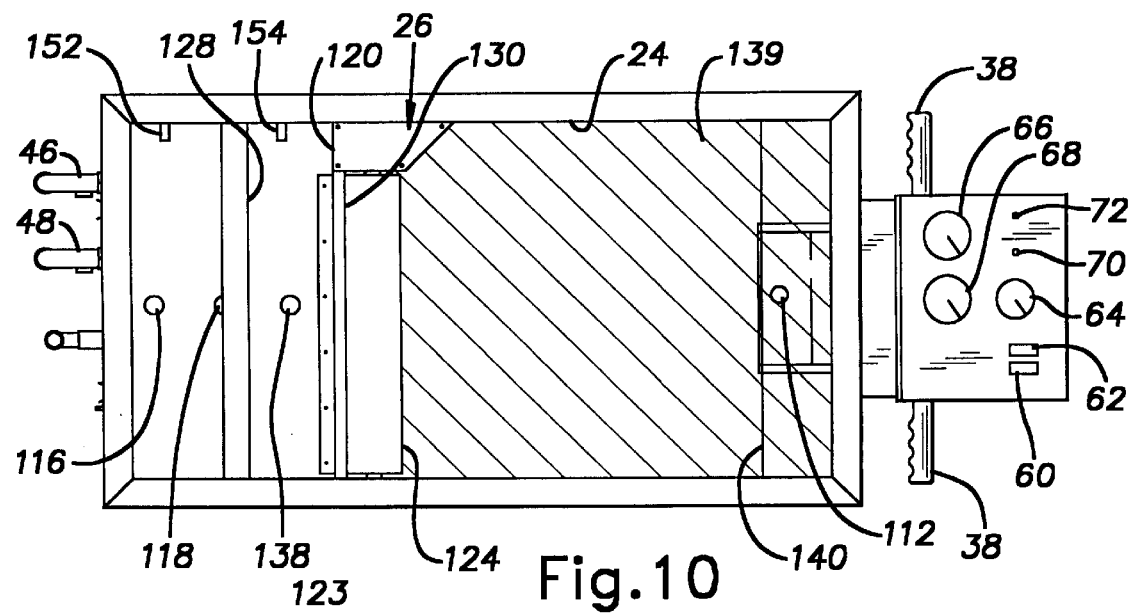
FIG. 10 is a top plan view similar to FIG. 2 but with a top cover removed.
Figure 11:
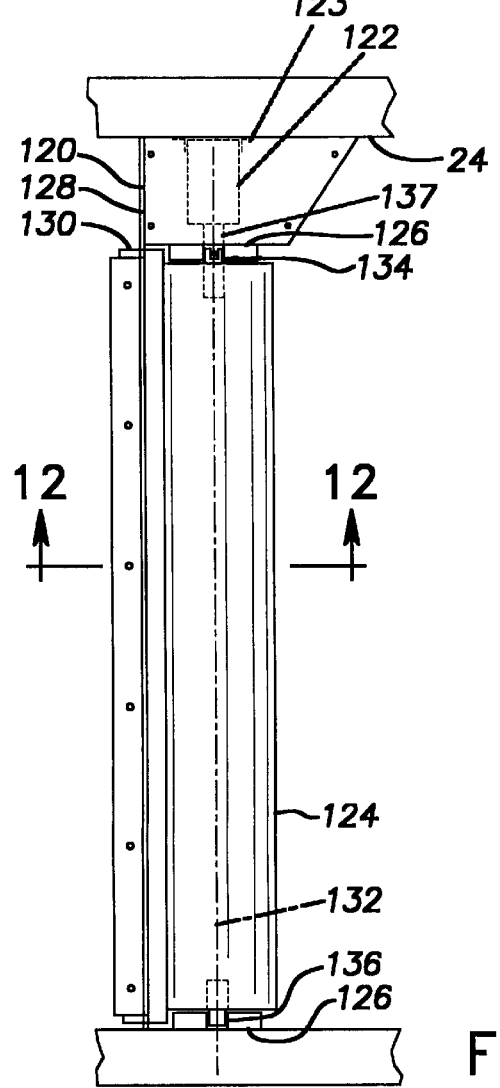
FIG. 11 is an enlarged view of a tramp oil skimmer of FIG. 10.
Figure 12:
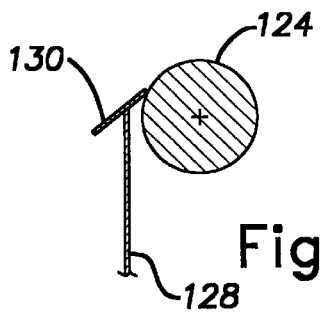
FIG. 12 is a cross-sectional view taken along line 12—12 in FIG. 11.

As best shown in FIGS. 7, 10, and 12, the tramp oil skimmer assembly 26 includes a motor housing 120, a motor 122, a skimmer roll 124, a pair of bushings 126, a storage tank 128, and a wiper blade 130. The skimmer assembly 26 is designed for easy removal of tramp oil from the surface of the coolant in the separator tank 24 and to have a relatively low profile. The motor housing 120 is attached to an inner surface of a sidewall of the separator tank 24 near a the forward end of the separator tank 24 at a height which positions the skimmer roll 124 slightly above the surface of the coolant in the separator tank 24. The motor housing 120 has a removable top cover to provide access to the motor 122. The motor 122 is held in the motor housing 120 by a removable clip 123. Therefore, the motor 122 can be easily removed for service. The motor housing 120 is provided with a drain which prevents coolant from filling the motor housing 120 and shorting the motor 122.

The skimmer roll 124 is generally cylindrically-shaped having a central longitudinally extending axis of rotation 132. The skimmer roll 124 is preferably formed from a suitable material which is resistant to damage from both oil and ozone such as, for example, polyvinyl chloride (PVC). The skimmer roll 124 is also preferably formed from a solid rod of material. Each end of the skimmer roll 124 is provided with a shaft 134, 136. The shafts 134, 136 are preferably press-fit into openings in the ends of the skimmer roll 124. One shaft 134 interlocks with an output shaft 137 of the motor 122 with a tongue-in-groove connection.

The shafts 134, 136 of the skimmer roll 124 are rotatably supported within the bushings 126 which allow rotation of the skimmer roll 124 about the substantially horizontal axis of rotation 132. One of the bushings 126 is mounted on the motor housing 120 and the other bushing is mounted on the inner surface of the tank sidewall opposite the motor housing 120. The bushings 126 are formed from a suitable material having excellent bearing properties such as, for example, Nylatron. The bushings 126 are preferably slotted at the top to allow the skimmer roll 124 to be easily inserted into and withdrawn from the bushings 126 from the top.

The motor 22 is a reversing electric motor which rotates the skimmer roll 124 at about 4 rpm. The motor 22 alternately rotates between a forward direction (clockwise as shown in FIG. 7) and a reverse direction (counter clockwise as shown in FIG. 7). The alternating rotation is controlled by a time delay relay located behind the control panel 58. The motor 22 rotates the skimmer roll 124 in the forward direction during a skimming interval to pick up tramp oil from the surface and carry it up and over to the wiper blade 130. The motor 22 rotates the skimmer roll 24 in the reverse direction in a non-skimming interval which pulls tramp oil on the surface under and to the forward side the skimmer roll 124. By pulling the tramp oil around the skimmer roll 124, the skimming interval is more efficient because more tramp oil is there to be picked up by the skimmer roll 124.

The tramp oil storage tank 128 is generally rectangularly-shaped having an open top and is located within the separator tank 24 at the forward side of the skimmer roll 124. The storage tank 128 extends between and is attached to the opposed sidewalls of the separator tank 24. The storage tank 128 is sized such that coolant can flow within the separator tank 24 below the storage tank 128 from the coolant inlet 112 to the coolant outlet 116. A tramp oil drain 138 is located at the bottom of the separator tank 24 and near the forward end of the separator tank 24. The tramp oil drain 138 is in fluid communication with the bottom of the storage tank 128. The tramp oil drain 138 is also in fluid communication with the first drain valve 46. The storage tank 128 is formed from a suitable material which is resistant to damage from oil such as, for example, stainless steel.

The wiper blade 130 is attached to a rear wall of the storage tank 128 at the top of the rear wall. The wiper blade 130 is a generally planar elongate strip which laterally extends across the storage tank 128 and engages the exterior peripheral surface of the skimmer roll 124 to strip tramp oil from the peripheral surface of the skimmer roll 124 as the peripheral surface rotates past the wiper blade 130. The wiper blade 130 preferably engages the skimmer roll 124 at a location above the rotational axis 132 of the skimmer roll 124. The wiper blade 130 is downwardly inclined from the skimmer roll 124 to the storage tank 128 so that oil stripped from the skimmer roll 124 is directed into the tramp oil storage tank 128 by gravity. The wiper blade 130 is formed from a suitable material which is resistant to damage from oil such as, for example, stainless steel.

As best shown in FIGS. 7 and 10, a coalescer pack 139 is provided within the separator tank 24 between the tank inlet 112 and the skimmer assembly 26. Preferably, the coalescer pack 139 extends from the front of the separator tank 24 to the tramp oil tank 128. The coalescer pack 139 preferably rests on the bottom of the separator tank 24 and is held within the separator tank 24 by a retaining bar 140 which laterally extends across the top of the separator tank 24 above the coalescer pack 139. Therefore, the coalescer pack 139 can be removed from the separator tank 24 by simply removing the retaining bar 140. The coalescer pack 139 forms a labyrinth of cells so that the coolant does not have a direct path between the inlet 112 and the outlet 116. That is, the coolant must come into contact with multiple walls to travel from the inlet 112 to the outlet 116. Preferably, the coalescer pack 139 is formed of a plastic material.

The coolant outlet 116 of the separator tank 24 is connected to the second inlet 94 of the air pump 22. Preferably, a one-way check valve 142 is provided in the line between the tank outlet 116 and the air pump second inlet 94 to prevent reverse flow into the tank 22. The second outlet 98 of the air pump 22 is in fluid communication with the inlet of the final filter 28.

The final filter 28 has a filter element sized for removing small fines or dust from the coolant. Preferably, the filter element has a size in the range from about 25 microns to about 100 microns. The filter element is preferably a disposable filter element. The pressure gauge 68 is connected to the final filter 28 for displaying the pressure at the downstream side of the filter element to indicate to the operator when the filter element should be changed.

The discharge hose 30 is a length of relatively flexible hose or tubing having an inlet end 144 and an outlet end 146. The inlet end 144 of the discharge hose 30 is in fluid communication with the outlet of the final filter 28 so that, when the outlet end 146 is located in the sump 16, coolant is transferred from the final filter 28 back to the sump 16. The discharge hose 30 is preferably formed from a durable material which is flexible and resistant to damage from both oil and ozone such as, for example, reinforced Tygon tubing.

The ozone generator 32 is preferably of the type which generates ozone with an ultra violet light bulb. A tube 148 extends from the ozone generator 32 to the ozone inlet 114 of the separator tank 24 so that the ozone enters the separator tank 24 and is dissolved into the coolant. The ozone, sometimes called active oxygen, purifies the coolant by killing bacteria, yeast and fungus which grows in the machine center sump. The tube 148 which extends from the ozone generator 32 to the separator tank 24 has a loop 150 that extends above the fluid level in the separator tank 24. Preferably, the tube 148 is provided with a check valve to prevent fluid from entering into the ozone generator 32.

The separator tank 24 and the tramp oil storage tank 128 are each provided with an overflow sensor 152, 154. The sensor 152, 154 are located near the top of the tanks 24, 128 so that the sensors 152, 154 detect fluid when the tanks 24, 128 are nearly full and about to overflow. Preferably, the sensors 152, 154 are electro-optic level sensors. The sensors 152, 154 are connected to and activate the second indicator light 70 and audible alarm to warn the operator when the fluid level in either tank 24, 128 is too high. In addition, the sensors 152, 154 disable the pneumatics of the cart in order to prevent an overflow situation.

The reconditioning system 10 can be used to recondition coolant in a sump 16 of either an active or an inactive machine. To recondition the coolant of an active machine, the separator tank 24 must first be filled or charged with coolant of the same kind as the coolant located in the machine sump 16. Once the separator tank 24 is charged, the cart 12 is moved to the machine sump 16. The in-sump pickup 18 and discharge line 30 are dropped into the machine sump 16, an air hose is connected to air inlet plug 102, and the power cord 50 is plugged into a suitable electrical outlet. If not already in place, the cover 40 is placed on the cart 12 to prevent extraneous debris from getting into the cart 12 and to dampen noise created within the cart 12.

To start the reconditioning process, the operator activates the main power switch 60. Once the reconditioning system 10 is energized, the solenoid valve 104 opens and allows air to flow from the air hose to the air pump 22, the ozone generator 32 starts to produce ozone, and the overflow sensors 152, 154 are enabled. The operator activates the skimmer power switch 62 and the skimmer roll 124 starts rotating in alternating forward and reverse directions. The interval of alternating rotation is set by adjusting a time delay relay located below the control panel 58.

Coolant from the machine sump 16 is drawn into the in-sump pickup 18 by the air pump 22. The in-sump pickup 18 is floating on the surface of the coolant within the machine sump 16 to remove any tramp oil which rises to the surface of the fluid in the sump 16. The coolant passes through the intake hose 74 to the initial filter 20 which removes large particles or debris from the coolant. The coolant is drawn from the initial filter 20 to the air pump 22 and is then pumped into the coolant inlet 112 at the forward end of the separator tank 24.

The coolant enters the separator tank 24 below the coalescer pack 138 and passes over the pneumatic muffler through which ozone is pumped from the ozone generator 32. The ozone is dissolved into the coolant and kills any bacteria, yeast or fungus present in the coolant to eliminate the foul odor common in unstable coolants. The coolant flows in a rearward direction through the separator tank 24 through the labyrinth of cells of the coalescer pack 138. Small droplets of tramp oil come into contact with the walls of the coalescer pack 138 and stick until they start to rise to the surface of the fluid in the separator tank 24. As the small droplets come into contact with other tramp oil droplets, they combine and rise faster to the surface. The net effect is the separation of homogenized tramp oil from the coolant within the separator tank 24.

The tramp oil skimmer assembly 26 removes tramp oil from the surface of the coolant within the separator tank 24. The fluid level in the tank is just high enough to come into contact with the peripheral surface of the skimmer roll 124. The skimmer roll 124 rotates in the forward direction (clockwise as viewed in FIG. 7) during a skimming interval which removes tramp oil from the separator tank 24 and rotates in the reverse direction (counterclockwise as viewed in FIG. 7) in a non-skimming interval which pulls tramp oil under and to the forward side of the skimmer roll 124 to make the skimming interval more efficient.

The tramp oil, floating on the surface, comes into contact with and sticks to the forwardly rotating skimmer roll. The wiper blade 130 rubs against the forward side of the skimmer roll 124 and strips the tramp oil from the skimmer roll 124. The tramp oil which is striped from the skimmer roll 124 drops into the tramp oil storage tank 128. If the tramp oil level gets too high within the tramp oil storage tank 128, the overflow sensor 154 activates an alarm, illuminates the second indicator light 72, and/or shuts off all functions of the reconditioning system 10 except for the ozone generator 32. The tramp oil storage tank 128 is drained by opening the first drain valve 46. The operator can turn-off the tramp oil skimmer assembly 26 with the skimmer power switch 62 when no tramp oil is present in the separator tank 24 to prevent coolant from being picked up and deposited into the tramp oil storage tank 128 and thereafter disposed.

Coolant passes under the tramp oil storage tank 128 and over a weir. If the coolant level gets too high within the separator tank 24, the overflow sensor 152 activates an alarm, illuminates the second indicator light 72, and/or shuts off all functions of the reconditioning system except for the ozone generator 32.

Coolant is drawn out of the separator tank 24, by the air pump 22, through the coolant outlet 116 located at the rear end of the separator tank 24. The coolant then passes through the air pump 22 to the final filter 28 which polishes off the coolant by removing fine particles from the coolant, preferably to twenty-five microns. The coolant flows from the final filter 28 back to the machine sump 16 through the discharge line 30 and is discharged near the bottom of the sump 16.

All the vital signs of the reconditioning system 10 can be monitored on the control panel 58. The pressure gauges 66, 68 display the air supply pressure and the pressure at the final filter 28. The vacuum gauge 64 displays the amount of vacuum at the initial filter 20. The first indicator light 70 alerts the user to a problem with the ozone generator 32. The second indicator light 72, preferably along with an alarm, indicates an overflow situation in either the tramp oil storage tank 128 or the separator tank 24.

When the reconditioning of the coolant in the machine sump 16 is complete, the in-sump pickup 18 is removed from the sump 16. The main power switch 60 is then turned off, the air hose and the power cord 50 are unplugged, and the discharge line 30 is removed and allowed to drain into the machine sump 16. The hoses 74, 30 are then laid onto the cover 40 of the cart 12 using the raised cylinders 42 of the cover 40 and clipping the hoses 74, 30 into the hose clamps 44. Because the electrical power cord 50 is self-retracting, there are no loose cords or hoses to deal with when moving the cart 12.

From the above description it can be seen that the reconditioning system 10 advantageously removes tramp oil, removes solids such as large debris and small fines, and attacks bacteria and fungus so that the life of the coolant is extended to reduce storage costs, liability, disposal costs and new coolant costs.

Although particular embodiments of the invention have been described in detail, it will be understood that the invention is not limited correspondingly in scope, but includes all changes and modifications coming within the spirit and terms of the claims appended hereto.

What is claimed is:

1. A reconditioning system for withdrawing oily liquid from a sump, removing oil from the oily liquid, and returning reconditioned liquid to the sump, said reconditioning system comprising:

a separator tank adapted for containing oily liquid and having an inlet for oily liquid and an outlet for reconditioned liquid;

an in-sump pickup including an intake hose connected to said inlet of said separator tank through which flows oily liquid from the sump to said separator tank;

a discharge hose connected to said outlet of said separator tank through which flows reconditioned liquid from said separator tank to the sump;

a pump for forcing oily liquid from the sump to said separator tank through said intake hose and forcing reconditioned liquid from said separator tank to the sump through said discharge hose; and a skimmer assembly including a cylindrically-shaped skimmer roll located at the surface of the oily liquid in said separator tank and rotatable about a substantially horizontal axis, a storage tank, a drive member arranged to alternately rotate said skimmer roll in each direction about said axis, and a wiper blade bearing against said skimmer roll and arranged to wipe oil from the skimmer roll and to direct oil from said skimmer roll into said storage tank.

2. The reconditioning system according to claim 1, further comprising an ozone generator connected to said separator tank for dissolving ozone into oily liquid in said separator tank.

3. The reconditioning system according to claim 1, further comprising an initial filter located between said inlet line and said separator tank and a final filter located between said separator tank and said discharge line.

4. The reconditioning system according to claim 1, wherein said separator tank has a coalescer pack located between said inlet and said outlet.

5. The reconditioning system according to claim 1, wherein said intake hose is a flexible hose and said in-sump pickup further includes a suction nozzle attached to an inlet end of said intake hose and a float attached to said suction nozzle, said float arranged to provide the buoyancy necessary to float said suction nozzle on oily liquid in an oil removing position.

6. The reconditioning system according to claim 5, wherein said suction nozzle is a generally rigid tube and said float is a ring encircling said tube.

7. The reconditioning system according to claim 1, wherein said pump is a split diaphragm air pump.

8. The reconditioning system according to claim 1, wherein said drive member is a reversing electric motor.

9. A reconditioning system for withdrawing a coolant and oil mixture from a sump, removing oil from the mixture, and returning reconditioned coolant to the sump, said reconditioning system comprising:

a separator tank adapted for containing the mixture and having an inlet for the coolant and oil mixture, an outlet for the reconditioned coolant, and a coalescer pack located between said inlet and said outlet;

an ozone generator connected to said separator tank for dissolving ozone into oily liquid in said separator tank;

an in-sump pickup including an intake hose connected to said inlet of said separator tank through which flows the mixture from the sump to said separator tank;

an initial filter located between said intake hose and said separator tank;

a discharge hose connected to said outlet of said separator tank through which flows the reconditioned coolant from said separator tank to the sump;

a final filter located between said separator tank and said discharge hose;

a split diaphragm air pump for forcing the mixture from the sump to said separator tank through said intake hose and forcing the coolant from said separator tank to the sump through said discharge hose; and a skimmer assembly including a cylindrically-shaped skimmer roll located at the surface of the mixture in said separator tank and rotatable about a substantially horizontal axis, a storage tank, a reversing electric motor arranged to alternately rotate said skimmer roll in each direction about said axis, and a wiper blade bearing against said skimmer roll and arranged to wipe oil from said skimmer roll and to direct oil from said skimmer roll into said storage tank.

10. The reconditioning system according to claim 9, wherein said intake hose is a flexible hose and said in-sump pickup further includes a suction nozzle attached to an inlet end of said intake hose and a float attached to said suction nozzle, said float arranged to provide the buoyancy necessary to float said suction nozzle on the mixture in an oil removing position.

11. The reconditioning system according to claim 10, wherein said suction nozzle is a generally rigid tube and said float is a ring encircling said tube.

12. A portable reconditioning system for withdrawing oily liquid from a sump, removing oil from the oily liquid, and returning reconditioned liquid to the sump, said reconditioning system comprising:

a separator tank adapted for containing oily liquid and having an inlet for the oily liquid and an outlet for the reconditioned liquid;

an in-sump pickup capable of being dropped into the sump and through which flows oily liquid from the sump to said separator tank, said pickup including an flexible intake hose connected to said inlet of said separator tank, a suction nozzle having a generally rigid tube attached to an inlet end of said intake hose, and a ring-shaped float encircling said rigid tube, said float arranged to provide the buoyancy necessary to float said suction nozzle near a surface of the oily liquid in the sump;

a flexible discharge hose connected to said outlet of said separator tank and capable of being dropped into said sump and through which flows reconditioned liquid from said separator tank to the sump;

a pump for forcing oily liquid from the sump to said separator tank through said intake hose and forcing reconditioned liquid from said separator tank to the sump through said discharge hose;

a skimmer assembly located within the separator tank for removing oil from the surface of oily liquid within the separator tank; and a cart which carries said separator tank near the sump so that said in-sump pickup and said discharge hose can be dropped into the sump.

13. The reconditioning system according to claim 12, wherein said rigid tube comprises plastic.

14. The reconditioning system according to claim 12, wherein said rigid tube has an angled inlet end.

15. The reconditioning system according to claim 12, wherein said rigid tube has a fluted inlet end.

16. The reconditioning system according to claim 12, wherein said float comprises a foam material.

* * * * *